(12) United States Patent
Igata et al.

(10) Patent No.: US 11,386,475 B2
(45) Date of Patent: Jul. 12, 2022

(54) MAIL-ORDER SYSTEM

(71) Applicant: Toyota Jidosha Kabushiki Kaisha, Toyota (JP)

(72) Inventors: Hiroshi Igata, Yokohama (JP); Yuchi Yamanouchi, Toyota (JP); Atsushi Sajiki, Okazaki (JP); Hidenari Soya, Toyota (JP); Satoshi Usui, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 654 days.

(21) Appl. No.: 16/229,232

(22) Filed: Dec. 21, 2018

(65) Prior Publication Data

US 2019/0205966 A1    Jul. 4, 2019

(30) Foreign Application Priority Data

Dec. 28, 2017 (JP) .............................. JP2017-254605

(51) Int. Cl.
*G06Q 30/06* (2012.01)
*H04W 4/44* (2018.01)
(Continued)

(52) U.S. Cl.
CPC ....... *G06Q 30/0631* (2013.01); *G05D 1/0212* (2013.01); *G05D 1/0276* (2013.01);
(Continued)

(58) Field of Classification Search
CPC ......... G06Q 30/0631; G06Q 10/08355; G06Q 30/0202; G06Q 10/087; G06Q 30/0601;
(Continued)

(56) References Cited

U.S. PATENT DOCUMENTS

2003/0040944 A1    2/2003   Hileman
2014/0136414 A1*   5/2014   Abhyanker .......... G05D 1/0011
                                                       701/25

(Continued)

FOREIGN PATENT DOCUMENTS

CN        112149935 A  * 12/2020
JP        2001-338163 A   12/2001
(Continued)

*Primary Examiner* — James J Yang
(74) *Attorney, Agent, or Firm* — Dinsmore & Shohl LLP

(57) ABSTRACT

A mail-order system has a server apparatus and a moving object. The server apparatus includes a purchase likelihood information acquisition unit configured to acquire at least information regarding a commodity considered to be purchased by a user and information regarding a desired delivery destination of the commodity, and a moving object management unit configured to give an instruction relating to at least movement to the moving object. The moving object is able to load commodities. The moving object includes a movement controller configured to make the moving object move in an autonomous moving mode. At least one of the server apparatus and the moving object includes a positional information acquisition unit configured to acquire positional information of the moving object, and an inventory management unit configured to manage an inventory of commodities loaded in the moving object.

8 Claims, 9 Drawing Sheets

(51) Int. Cl.
*H04W 4/35* (2018.01)
*H04W 4/029* (2018.01)
*G06Q 10/08* (2012.01)
*G06Q 30/02* (2012.01)
*G05D 1/02* (2020.01)

(52) U.S. Cl.
CPC ..... *G06Q 10/087* (2013.01); *G06Q 10/08355* (2013.01); *G06Q 30/0202* (2013.01); *H04W 4/029* (2018.02); *H04W 4/35* (2018.02); *H04W 4/44* (2018.02); *G05D 2201/0213* (2013.01)

(58) Field of Classification Search
CPC ........ G06Q 10/083; H04W 4/44; H04W 4/35; H04W 4/029; H04W 4/024; G05D 1/0276; G05D 1/0212; G05D 2201/0213
See application file for complete search history.

(56) References Cited

U.S. PATENT DOCUMENTS

| | | | |
|---|---|---|---|
| 2016/0300393 A1 | | 10/2016 | Kinoshita |
| 2018/0300676 A1* | | 10/2018 | Peterson ............ G06Q 10/0832 |

FOREIGN PATENT DOCUMENTS

| | | | | |
|---|---|---|---|---|
| JP | 2002-133153 A | 5/2002 | | |
| JP | 2009-211476 A | 9/2009 | | |
| JP | 2015-069594 A | 4/2015 | | |
| JP | 2015-162033 A | 9/2015 | | |
| WO | WO-2017064202 A1 * | 4/2017 | ....... | G05B 19/41895 |

* cited by examiner

MAIL-ORDER SYSTEM

CROSS-REFERENCE TO RELATED APPLICATION

This application claims priority to Japanese Patent Application No. 2017-254605 filed on Dec. 28, 2017, which is incorporated herein by reference in its entirety.

BACKGROUND

1. Technical Field

The present disclosure relates to a mail-order system.

2. Description of Related Art

In the related art, as a method of allowing purchase of a commodity without a visit to a store, mail-order using a telecommunication line is known. In such mail-order, in general, a user confirms a catalog (including a commodity page or the like on a television program or an Internet site), and then, applies for purchase of a desired commodity, whereby the purchased commodity is to be delivered by a delivery company to a place designated by the user later.

In this way, there is an increasing need for a mechanism capable of allowing purchase of a commodity without a visit to a store in modern society where a communication infrastructure, such as the Internet, or a home delivery system has been developed, aging population or depopulation has advanced, and civilian work styles and living hours have been diversified.

On the other hand, in the method of mail-order described above, the user selects a commodity without seeing an actual object of the commodity and applies for purchase. It may not be possible to meet a demand of a user who wants to confirm an actual object of a commodity, and in particular, a user who wants to purchase accessories or sports goods after trial fitting or trial use.

Since the purchased commodity is delivered by the delivery company later, immediacy of supply to user's demand is lacking. This causes a decline of eagerness to purchase or degradation of the degree of satisfaction of the user toward the commodity. In transportation business including home delivery, there is growing shortage of drivers, and a delay in delivery often becomes a problem. Such a situation is likely to be not easily improved due to the further advance of decreasing birthrate and aging population.

A service that receives a return commodity within a predetermined period for free has been performed or a virtual trial fitting technique that allows trial fitting for virtually trying on clothes or the like on an image has been suggested (for example, Japanese Unexamined Patent Application Publication No. 2015-162033 (JP 2015-162033 A)).

A sales management system for realizing a service that sends an order to a mobile store merchant around the user and makes a mobile store deliver a commodity to a place designated by the user has been suggested (Japanese Unexamined Patent Application Publication No. 2002-133153 (JP 2002-133153 A)).

However, in the service that receives a return commodity for free, the user needs to perform a procedure for returning the commodity after receiving the commodity, and the procedure is complicated. An act of so-called ward robing that maliciously uses such a service and uses a commodity as free rental as the intention becomes a problem, and in some cases, such a service may not be provided. On the other hand, according to the virtual trial fitting technique on the image in JP 2015-162033 A, such a problem does not occur. However, since the user cannot try on an actual object, there is a significant restriction in that the user does not know a texture or a wearing feeling.

Even in the technique of JP 2002-133153 A, although the problem of immediacy is improved, it is not possible to meet the need of the user who wants to purchase a commodity while confirming an actual object.

SUMMARY

The disclosure provides a system capable of allowing a user to confirm an actual object of a commodity before purchase when there is a commodity considered to be purchased by the user in mail-order.

A first aspect of the disclosure relates to a mail-order system. The mail-order system includes a server apparatus and a moving object. The server apparatus includes a purchase likelihood information acquisition unit and a moving object management unit. The purchase likelihood information acquisition unit is configured to acquire at least information regarding a commodity (hereinafter, referred to as a purchase considering commodity) considered to be purchased by a user and information regarding a desired delivery destination of the commodity. The moving object management unit is configured to give an instruction relating to at least movement to the moving object. The moving object is able to load commodities. The moving object includes a movement controller. The movement controller is configured to make the moving object move in an autonomous moving mode. At least one of the server apparatus and the moving object includes a positional information acquisition unit and an inventory management unit. The positional information acquisition unit is configured to acquire positional information of the moving object. The inventory management unit is configured to manage an inventory of commodities loaded in the moving object. The moving object management unit is configured to give a service command to the moving object loading the commodity considered to be purchased by the user to move to the desired delivery destination.

The moving object is a moving object that moves based on a predetermined service command in an autonomous moving mode, and may be an autonomous driving vehicle. The service command is, for example, information including information relating to a destination or a moving route, information relating to a service to be provided on the route, and the like. For example, when the moving object is intended to move a store, a facility, or equipment, the service command can be a command to travel to a predetermined place, to develop a facility, and to provide a service.

The purchase likelihood information acquisition unit may be constituted of, for example, an interface that receives an input from the user, and a storage device. The purchase likelihood information acquisition unit may receive information from a different server apparatus through a communication line. The disclosure is not necessarily limited to an input from the user, and an input from a company side may be received or information may be acquired by reading data stored in the storage device.

The moving object management unit collects information regarding the position, the status of development, a loaded commodity group, and the like of the moving object, and generates and issues a service command of the moving object based on the information.

Both of the positional information acquisition unit and the inventory management unit may be provided in the moving object. The server apparatus may include a part of the units. The units may be constituted in such a manner that the moving object and the server apparatus share functions. In addition, a plurality of moving objects may constitute the units in cooperation.

The positional information acquisition unit is a unit that acquires information for specifying the position of the moving object, and may be, for example, a global positioning system (GPS) receiver, a camera, various sensors, such as an accelerometer, mounted in the moving object, a signal transmitter mounted in the moving object and a signal receiver provided at any point, or the like.

The inventory management unit may manage an inventory of commodities, for example, using a radio identification label (radio frequency identification (RFID) or the like). The inventory management used herein indicates a concept including not only counting of an inventory of commodities loaded in the moving object simply but also overall control of commodities to be loaded in the moving object.

With the mail-order system having such a configuration, when there is a commodity considered to be purchased by the user in mail-order, since the moving object that loads the commodity is moving to the delivery destination desired by the user, it is possible to allow the user to confirm an actual object of the commodity under consideration before purchase at any place.

In the mail-order system according to the first aspect of the disclosure, at least one of the server apparatus and the moving object may further include a route setting unit configured to set a moving route for allowing the moving object to move to the desired delivery destination based on information regarding the desired delivery destination acquired by the purchase likelihood information acquisition unit and the positional information acquired by the positional information acquisition unit. The movement controller may be configured to receive the service command and perform control such that the moving object moves along the route set by the route setting unit.

The route setting unit may be provided in the moving object or may be provided in the server apparatus. Alternatively, the route setting unit may be constituted in such a manner that the moving object and the server apparatus share functions.

With such a configuration, since the moving object can move to the desired delivery destination in an autonomous moving mode, unmanned delivery of the purchase considering commodity becomes possible. For this reason, it is possible to reduce delivery costs, and to solve a problem of driver shortage.

The mail-order system according to the first aspect of the disclosure may further include a base terminal apparatus that is used at a commodity loading base where commodities are loaded in the moving object. The inventory management unit may be configured to transmit a commodity load command as an instruction to load the commodity considered to be purchased by the user in the moving object to the base terminal apparatus. The moving object management unit may be configured to give the moving object an instruction to move to the commodity loading base where the base terminal apparatus receiving the commodity load command is present, and give an instruction to the moving object to move to the desired delivery destination.

Here, the commodity loading base is a facility where commodities are loaded in the moving object, and is a distribution base of commodities. The commodity loading base may double as a base of the moving object. The commodity loading base includes a place, such as a large-scale distribution center, and a base, such as a collection and delivery office in a town, regardless of scale. Furthermore, the terminal that receives the instruction from the inventory management unit may merely output the content of the instruction, and a worker may actually load commodities, or when loading of commodities is automated and machined, the terminal may further instruct a device loading commodities to load commodities.

With such a configuration, it is possible to make the moving object that reliably loads the commodity considered to be purchased by the user move toward the desired delivery destination, and to restrain target commodities, the actual objects of which can be confirmed before purchase, from being limited.

In the mail-order system according to the first aspect of the disclosure, the server apparatus may further include a recommended commodity information acquisition unit configured to acquire information regarding a recommended commodity according to the commodity considered to be purchased by the user. The inventory management unit may be configured to transmit an instruction to collectively load the recommended commodity in the moving object.

Here, information regarding the recommended commodity includes a commodity that has characteristics (color, size, material, function, quality, and the like) similar to the purchase considering commodity, a commodity that is often purchased along with the purchase considering commodity, a top selling commodity in a commodity field of the purchase considering commodity, and the like. The commodity information of the commodities may be acquired from a commodity database including specification information of commodities, a purchase history database including a purchase history of the user, or the like.

With such a configuration, when an actual object of the purchase considering commodity is presented to the user, since it is possible to present an actual object of the recommended commodity simultaneously, it is possible to allow the user to consider purchase of a commodity by comparing actual objects, and to increase convenience.

In the mail-order system according to the first aspect of the disclosure, the number of moving objects may be plural. The moving object management unit may be configured to, when the number of moving objects loading the commodity considered to be purchased by the user is plural, give an instruction to a moving object closest to the desired delivery destination among the moving objects to move to the desired delivery destination.

With such a configuration, since it is possible to more quickly present an actual object of the purchase considering commodity to the user, it is possible to contribute to user's convenience, and to reduce a possibility that user's eagerness to purchase is declined.

In the mail-order system according to the first aspect of the disclosure, the moving object may further include a locking and unlocking unit configured to lock and unlock a space where the commodity is loaded. The server apparatus may further include an authentication information issuance unit configured to issue authentication information for bringing the locking and unlocking unit into an unlocking state, and transmit the authentication information to a terminal used by the user and the locking and unlocking unit. With such a configuration, it is possible to restrain mischief or theft to commodities loaded in the moving object, and to increase safety.

In the mail-order system according to the first aspect of the disclosure, the moving object may further include a settlement unit configured to perform settlement of commodity trade. Note that a payment unit for use in settlement is not particularly limited insofar as the payment unit has a function of performing settlement, such as cash, a prepaid card, a credit card, electronic money, or virtual currency. Furthermore, the settlement unit does not need to be completely automated, and for example, a service staff may perform settlement using a register. With such a configuration, it is possible to allow the user to purchase an actual object actually confirmed by the user on the spot and to take out the commodity instantly.

A second aspect of the disclosure relates to a mail-order method that is performed using a moving object loadable commodities and movable in an autonomous moving mode. The mail-order method includes acquiring positional information of the moving object, acquiring inventory information of commodities loaded in the moving object, acquiring purchase likelihood information including information regarding a commodity considered to be purchased by a user and information regarding a desired delivery destination of the commodity, and giving a command to the moving object loading the commodity to move to the desired delivery destination based on the information regarding the commodity considered to be purchased by the user acquired in the acquiring of the purchase likelihood information.

Note that the disclosure can be specified as a mail-order system or a server apparatus including at least a part of the units described above. Furthermore, the disclosure can be specified as a method that the mail-order system or the server apparatus described above performs. The processing or the units described above may be implemented in any combination insofar as technical contradictions do not occur.

According to the aspects of the disclosure, it is possible to provide a system capable of, when there is a commodity considered to be purchased by a user in mail-order, allowing a user to confirm an actual object of the commodity before purchase.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION

Example 1

System Outline

The outline of a mail-order system according to Example 1 will be described referring to FIG. 1. The mail-order system according to the example includes a plurality of autonomous traveling vehicles 100 that performs autonomous traveling based on a given command, and a server apparatus 200 that issues the command. The autonomous traveling vehicles 100 are autonomous driving vehicles that are able to load various commodities, and the server apparatus 200 is an apparatus that manages the autonomous traveling vehicles 100.

The autonomous traveling vehicles 100 are vehicles that travel on a road in an autonomous traveling mode, and can load commodities different for each individual. The commodities used herein include various commodities insofar as the commodities have size and weight capable of being loaded in the vehicles. When the commodities are expendables, such as foods and beverages or cosmetics, subdivided samples may be loaded instead of the commodities. Each of the autonomous traveling vehicles 100 can include equipment according to commodities to be loaded. For example, a vehicle that loads perishable foods can include refrigeration equipment, and a vehicle that loads accessories can a trial fitting space, a full-length mirror, or the like.

Each of the autonomous traveling vehicles 100 also includes a terminal that performs settlement of commodity trade, and security equipment.

The autonomous traveling vehicles 100 are not necessarily unmanned vehicles. For example, a sales staff, a security staff, or the like may be getting on each autonomous traveling vehicle. The autonomous traveling vehicles 100 may not necessarily be vehicles that can travel in an autonomous traveling mode. For example, the autonomous traveling vehicle may be a vehicle that a person drives or assists driving depending on situations.

The server apparatus 200 is an apparatus that acquires purchase likelihood information including information regarding a purchase considering commodity from a user and information regarding a desired delivery destination of the commodity, and gives a command of service to the autonomous traveling vehicles 100. The server apparatus 200 provides, for example, an Internet shopping site or the like, and acquires order information, purchase likelihood information, and the like from a user of the site. The server apparatus 200 transmits a service command to the autonomous traveling vehicle 100 (loading the purchase considering commodity) traveling in the vicinity to move toward the desired delivery destination of the user based on the acquired information.

System Configuration

The constituent elements of the system will be described in detail.

Figure 1:
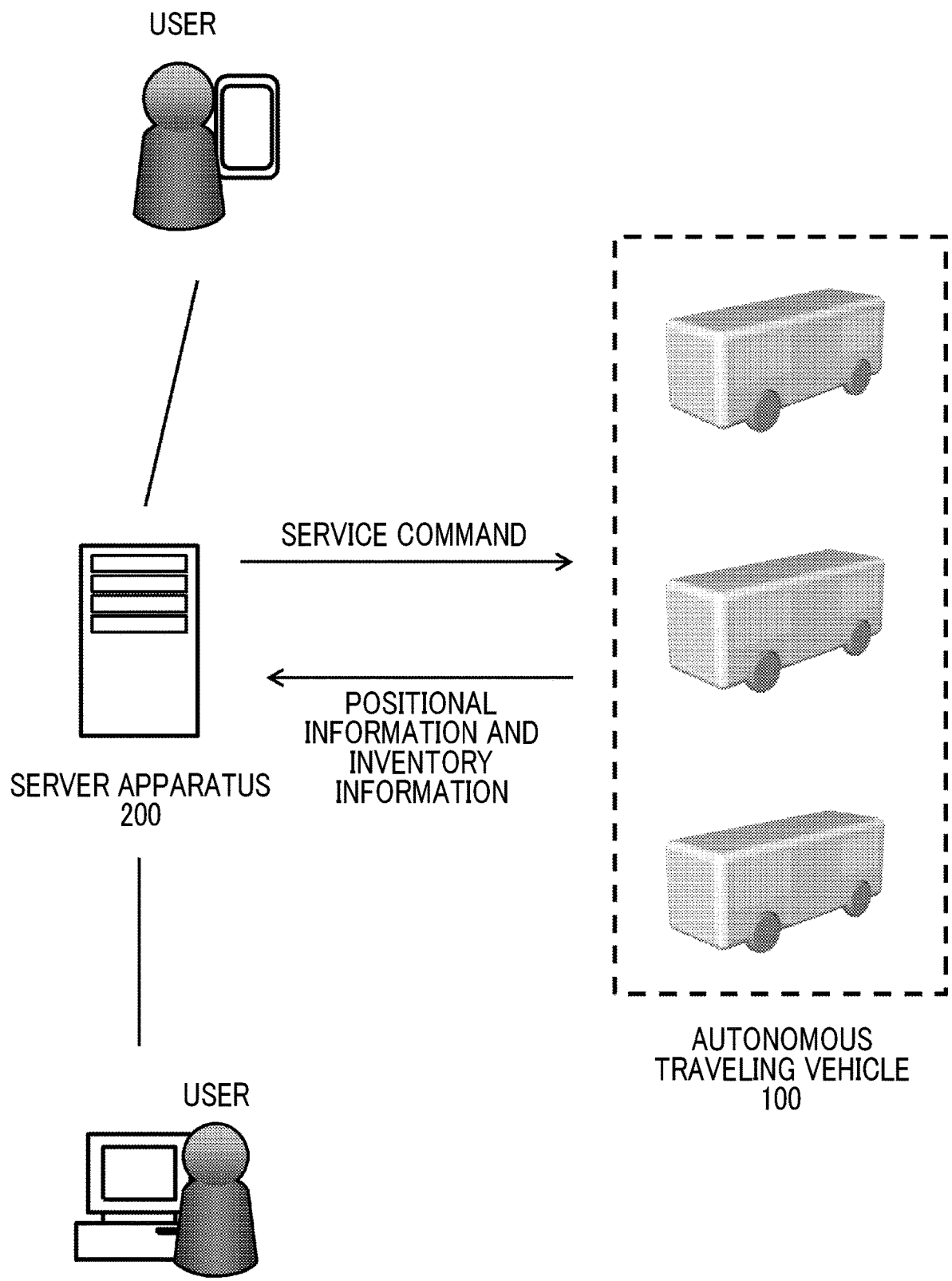
FIG. 1 is a system outline diagram of a mail-order system according to Example 1.
Figure 2:
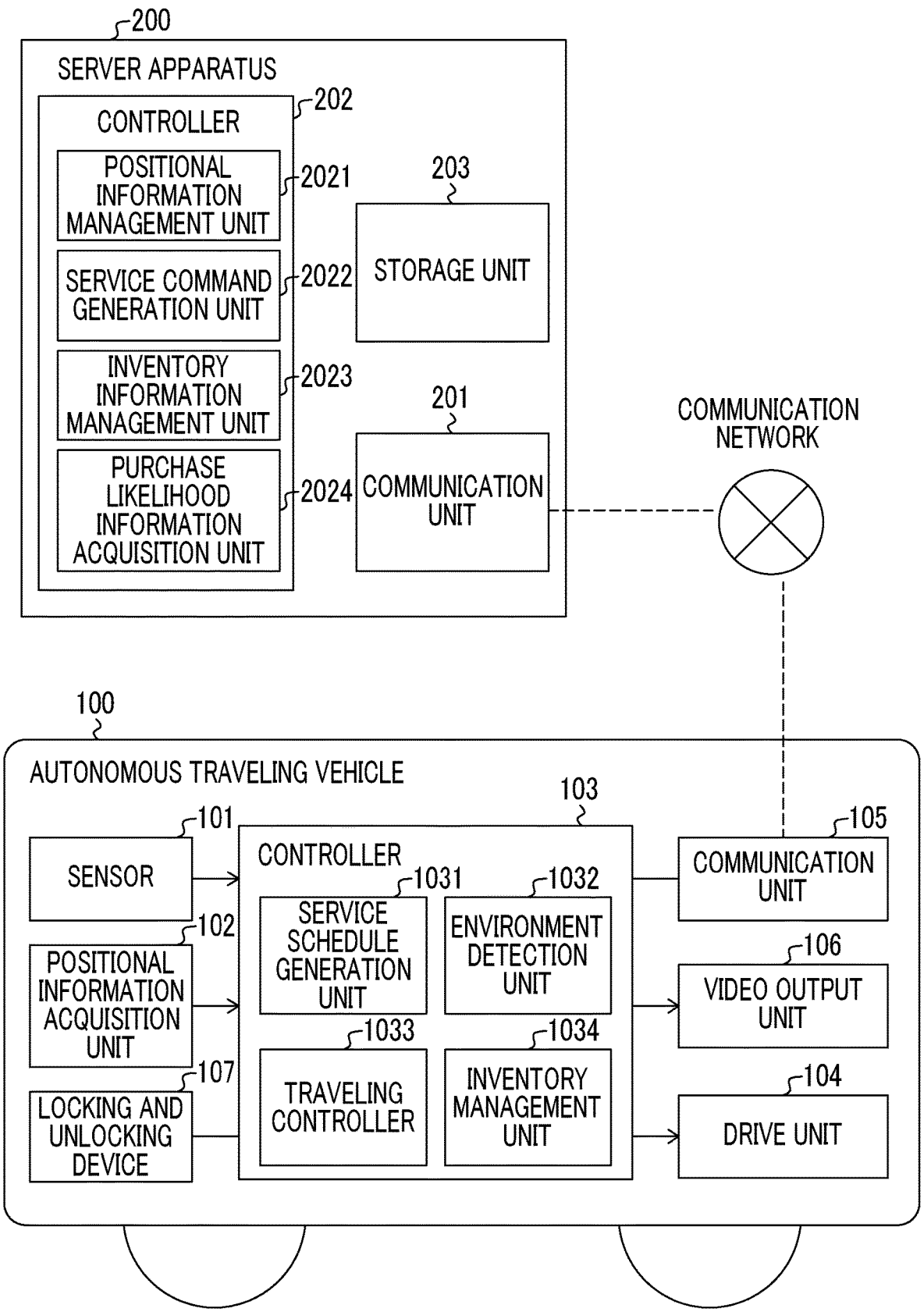
FIG. 2 is a block diagram schematically showing an example of constituent elements in the mail-order system of Example 1.

FIG. 2 is a block diagram schematically showing an example of the configuration of the autonomous traveling vehicle 100 and the server apparatus 200 shown in FIG. 1. The number of autonomous traveling vehicles 100 may be plural.

The autonomous traveling vehicle 100 is a vehicle that travels according to the service command acquired from the server apparatus 200. Specifically, the autonomous traveling vehicle 100 generates a traveling route based on the service command acquired through wireless communication and travels on a road using an appropriate method while sensing the surroundings of the vehicle.

The autonomous traveling vehicle 100 includes a sensor 101, a positional information acquisition unit 102, a controller 103, a drive unit 104, a communication unit 105, a video output unit 106, and a locking and unlocking device 107. The autonomous traveling vehicle 100 operates with electric power to be supplied from a battery (not shown).

The sensor 101 is means for sensing the surroundings of the vehicle, and typically includes a stereo camera, a laser scanner, light detection and ranging (LIDAR), a radar, and the like. Information acquired by the sensor 101 is transmitted to the controller 103. The positional information acquisition unit 102 is means for acquiring a current position of the vehicle, and typically includes a GPS receiver and the like. Information acquired by the positional information acquisition unit 102 is transmitted to the controller 103.

The controller 103 is a computer that performs control of the autonomous traveling vehicle 100 based on information acquired from the sensor 101. The controller 103 is constituted of, for example, a microcomputer.

The controller 103 has, as functional modules, a service schedule generation unit 1031, an environment detection unit 1032, a traveling controller 1033, and an inventory management unit 1034. The functional modules may be realized by a central processing unit (CPU) (not shown) executing a program stored in storage means (not shown), such as a read only memory (ROM).

The service schedule generation unit 1031 acquires the service command from the server apparatus 200 and generates a service schedule of the host vehicle. In the example, the service schedule is data that defines a route, along which the autonomous traveling vehicle 100 travels, and processing to be performed by the autonomous traveling vehicle 100 in a part or the whole of the route. As an example of data included in the service schedule, for example, the following data is exemplified.

(1) Data that Represents a Route, Along which the Host Vehicle Travels, with a Set of Road Links The route, along which the host vehicle travels, may be automatically generated based on given departure place and destination, for example, with reference to stored map data or the like. The route, along which the host vehicle travels, may be generated using an external service. The route, along which the host vehicle travels, may be provided from the server apparatus. That is, the route, along which the host vehicle travels, may be included in the service command.

(2) Data that Represents the Processing to be Performed by the Host Vehicle at a Point on the Route The processing to be performed by the host vehicle includes, for example, but is not limited to, "making a person get on or off the vehicle", "performing collection of data", and "performing advertisement for a commodity to be loaded in the host vehicle (using a vehicle external display described below)". The service schedule generated by the service schedule generation unit 1031 is transmitted to the traveling controller 1033 described below.

The environment detection unit 1032 detects an environment around the vehicle based on data acquired by the sensor 101. A target of detection is, for example, but not limited to, the number or positions of lanes, the number or positions of vehicles around the host vehicle, the number or positions of obstacles (for example, pedestrians, bicycles, structures, buildings, or the like) around the host vehicle, the structure of roads, road signs, or the like. Any target of detection may be applied insofar as the target of detection is needed to perform autonomous traveling.

The environment detection unit 1032 may track a detected object. For example, the difference between the coordinates of an object detected before one step and the current coordinates of the object may be used to obtain a relative speed of the object.

Data (hereinafter, referred to as environment data) relating to the environment detected by the environment detection unit 1032 is transmitted to the traveling controller 1033 described below.

The traveling controller 1033 controls traveling of the host vehicle based on the service schedule generated by the service schedule generation unit 1031, environment data generated by the environment detection unit 1032, and the positional information of the host vehicle acquired by the positional information acquisition unit 102. For example, the host vehicle is made to travel along a predetermined route such that an obstacle does not enter a predetermined safety area centering on the host vehicle. In regard to a method of making the vehicle travel in an autonomous traveling mode, a known method can be employed.

The inventory management unit 1034 manages the commodities loaded in the autonomous traveling vehicle 100 and an inventory quantity of the commodities. Specifically, for example, warehousing and shipping of a commodity may be detected by reading a tag attached to the commodity with an antenna for a radio identification label, such as RFID, and information regarding warehousing and shipping may be stored.

The drive unit 104 is means for making the autonomous traveling vehicle 100 travel based on a command generated by the traveling controller 1033. The drive unit 104 includes, for example, a motor and an inverter that drive wheels, a brake, a steering mechanism, and the like.

The communication unit 105 is communication means for connecting the autonomous traveling vehicle 100 to a network. In the example, the communication unit 105 can perform communication with other apparatuses (for example, the server apparatus 200) by way of the network using a moving object communication service, such as third generation (3G) or long-term evolution (LTE).

The communication unit 105 may further communication means for performing inter-vehicle communication with other autonomous traveling vehicles 100.

Figure 3:
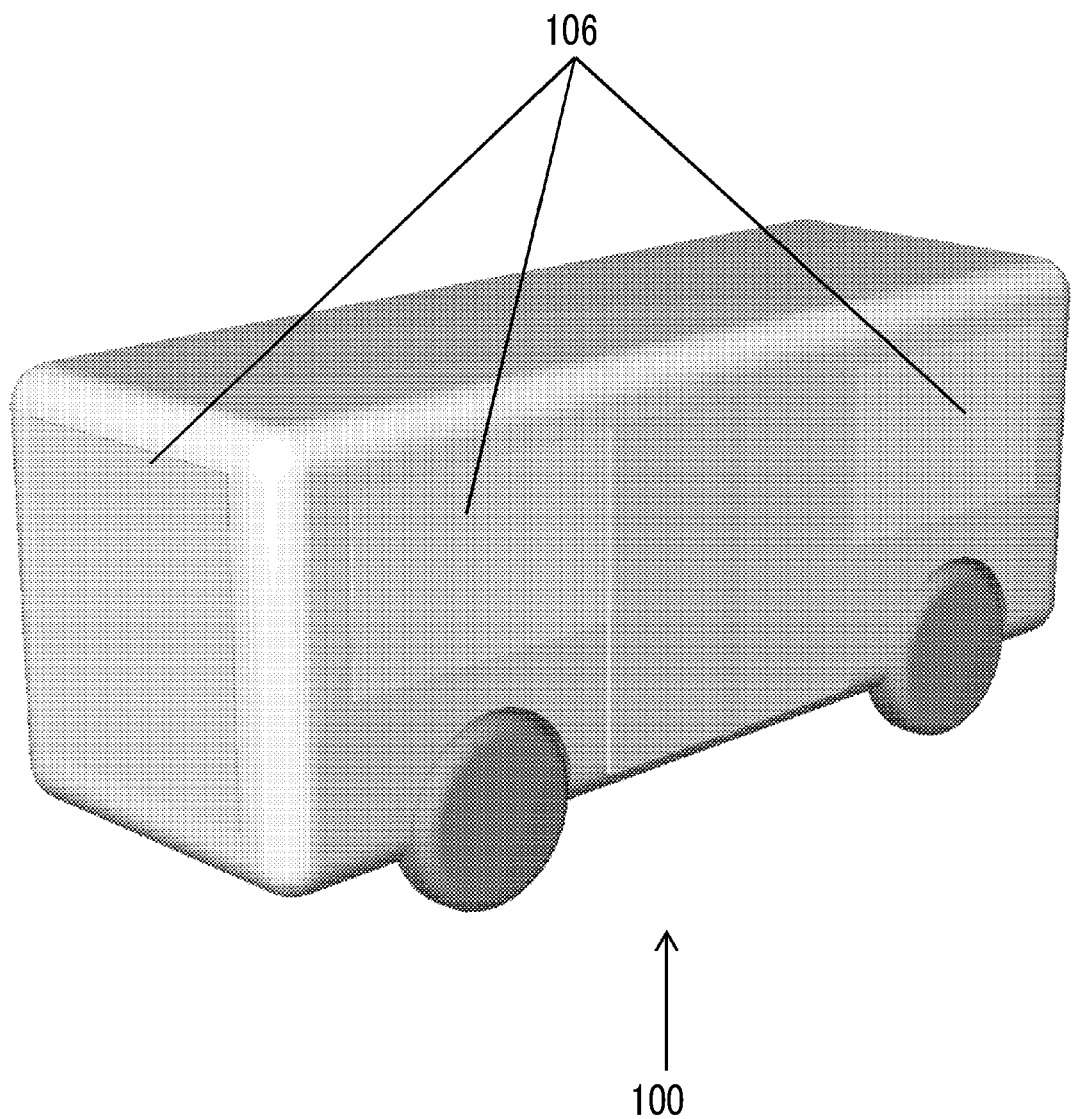
FIG. 3 is a diagram showing the appearance of an autonomous traveling vehicle.

The video output unit 106 is means for outputting video to a vehicle external display provided in a vehicle body. FIG. 3 is a diagram illustrating the appearance of the autonomous traveling vehicle 100. As shown in the drawing, in the example, the autonomous traveling vehicle 100 has a plurality of displays outward of the vehicle and can output any video. The vehicle external displays may be liquid crystal displays or may be constituted of a light emitting diode (LED) matrix or the like. The video output unit 106 can generate or acquire video based on data included in the service schedule and can output video to the vehicle external display.

The locking and unlocking device 107 performs locking and unlocking of a door of the autonomous traveling vehicle 100. Locking is basically performed all the time with a so-called auto-lock system, and when predetermined authentication is obtained, the door is unlocked. For example, when authentication information for unlocking is included in the service command received from the server apparatus 200, and the user performs authentication in conformity with the authentication information, the door may be unlocked. That is, the locking and unlocking device 107 performs a security function of the vehicle.

The server apparatus 200 will be described. The server apparatus 200 is an apparatus that acquires purchase likelihood information from the user, manages traveling positions of the autonomous traveling vehicles 100, and transmits a service command. The server apparatus 200 has a communication unit 201, a controller 202, and a storage unit 203.

Similarly to the communication unit 105, the communication unit 201 is a communication interface that is used to perform communication with the autonomous traveling vehicle 100, a user terminal, or the like by way of the network.

The controller 202 is means for controlling the server apparatus 200. The controller 202 is constituted of, for example, a CPU.

The controller 202 has, as functional modules, a positional information management unit 2021, a service command generation unit 2022, an inventory information management unit 2023, and a purchase likelihood information acquisition unit 2024. The functional modules may be realized by a CPU (not shown) executing a program stored in storage means (not shown), such as a ROM.

The positional information management unit 2021 collects positional information from the autonomous traveling vehicles 100 under management and manages the positional information. Specifically, the positional information is received from the autonomous traveling vehicles 100 in every predetermined cycle, and is stored in the storage unit 203 in association with time.

When the purchase likelihood information is received, the service command generation unit 2022 decides the autonomous traveling vehicle 100 to be sent and generates a service command. The autonomous traveling vehicle 100 to be a transmission destination of the service command is decided according to the positional information of each vehicle acquired by the positional information management unit 2021, attribute information (what commodity is loaded and what function is provided in the vehicle) of each vehicle stored in advance in the server apparatus 200, and the like.

The inventory information management unit 2023 manages information regarding commodities loaded in the autonomous traveling vehicle 100 to be managed and an inventory of the commodities. Here, the management includes not only collecting of the inventory information simply but also instructing for replacement or supplementation of commodities as needed.

The purchase likelihood information acquisition unit 2024 acquires the purchase likelihood information including information regarding the purchase considering commodity and information regarding the desired delivery destination of the commodity, for example, from the user of the Internet shopping site.

Here, information regarding the purchase considering commodity may include not only a commodity explicitly designated as a purchase considering target by the user but also, for example, a commodity stored in a so-called "shopping cart" on the site for a predetermined period. When the same commodity is registered in the "shopping cart" multiple times even without being purchased, the commodity may be set as a purchase considering commodity. Even though there is no registration in the shopping cart, an inquired commodity may be set as a purchase considering commodity with reference to an inquiry history. Information regarding the desired delivery destination is not limited to a place clearly designated by the user, and may be a registered address of the user, a registered delivery destination address (a workplace or a convenience store), or the lie.

A transmission source of the purchase likelihood information is not necessarily a general user, and may be, for example, a company that operates the autonomous traveling vehicle 100, a system that provides an Internet shopping site, or the like. Specifically, information may be transmitted by allowing the user to give information to an operator using a telephone or the like, and the operator may input information to a business terminal, thereby transmitting information.

The storage unit 203 is means for storing information, and is constituted of a random access memory (RAM) or a storage medium, such as a magnetic disk or a flash memory.

Vehicle Service Operation of System

Figure 4:
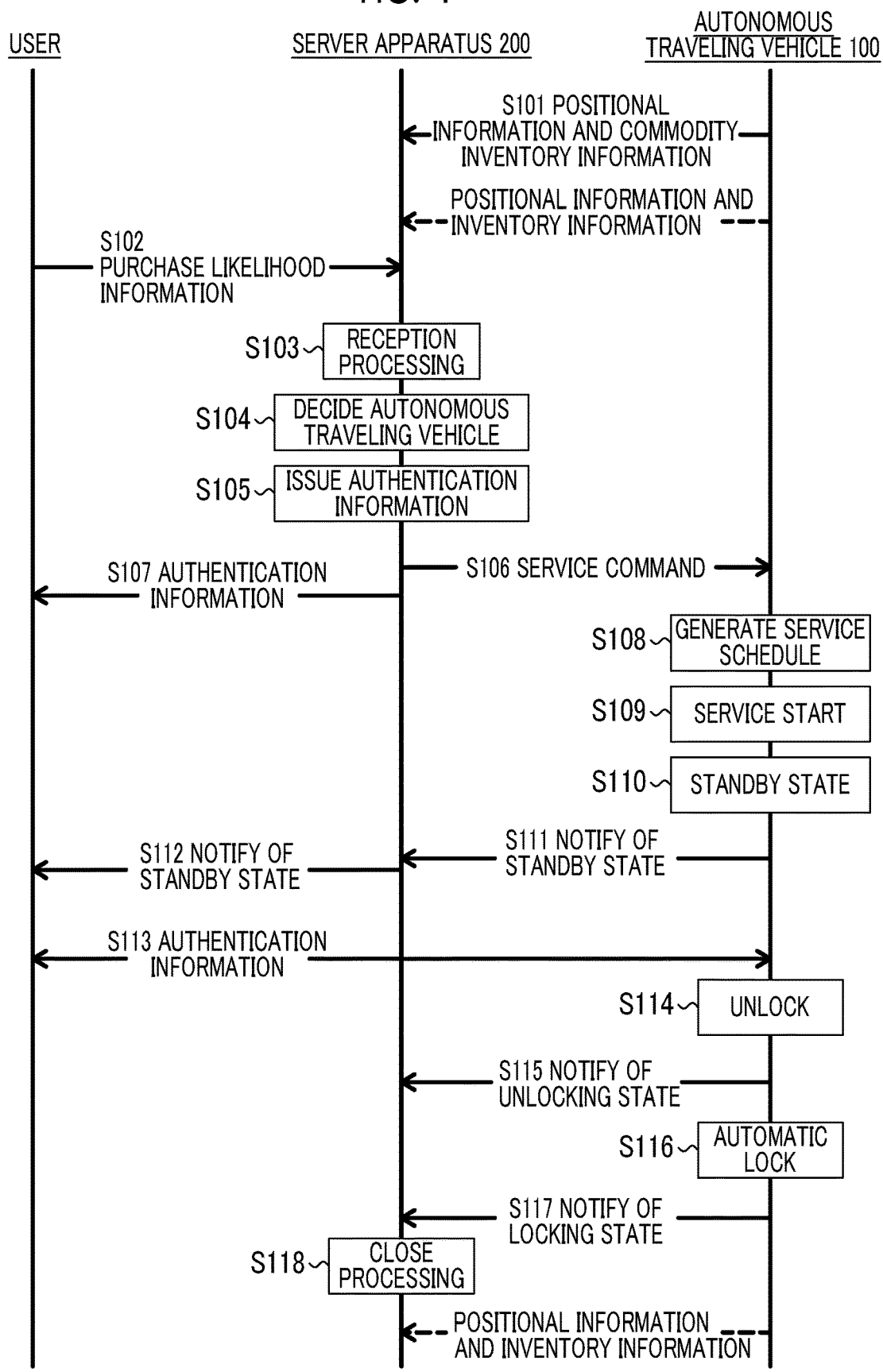
FIG. 4 is a diagram showing data that is transmitted and received between the constituent elements of the system.

Processing that the constituent elements described above perform will be described. FIG. 4 is a diagram illustrating a data flow in the system according to the example. In the example, description will be provided with an example where the autonomous traveling vehicle 100 is serviced on a road network shown in FIG. 5.

The autonomous traveling vehicle 100 notifies the server apparatus 200 of positional information and commodity inventory information at regular intervals (Step S101). For example, in the example of FIG. 5, the autonomous traveling vehicle 100 notifies the server apparatus 200 that the autonomous traveling vehicle 100 is positioned in a node A, the positional information management unit 2021 stores the autonomous traveling vehicle 100 in the storage unit 203 in association with the node A. The autonomous traveling vehicle 100 notifies the server apparatus 200 of inventory information of commodities belong currently loaded, and the inventory information management unit 2023 stores the inventory information in the storage unit 203. Positional information may not necessarily be positional information of the node. For example, positional information may be information for specifying a node or a link. A link may be divided into a plurality of sections. A road network may not necessarily be represented by nodes and links. When the autonomous traveling vehicle 100 moves, the positional information is updated every time.

When the user transmits the purchase likelihood information to the server apparatus 200 through communication means (not shown) (Step S102), the server apparatus 200 (purchase likelihood information acquisition unit 2024) performs processing for receiving a request from the user (Step S103). The processing will be described below in detail. When the reception processing is completed, the server apparatus 200 (service command generation unit 2022) decides the autonomous traveling vehicle 100 corresponding to the request of the user (Step S104), and issues authentication information for bringing the locking and unlocking device 107 of the vehicle into an unlocking state (Step S105).

Figure 5:
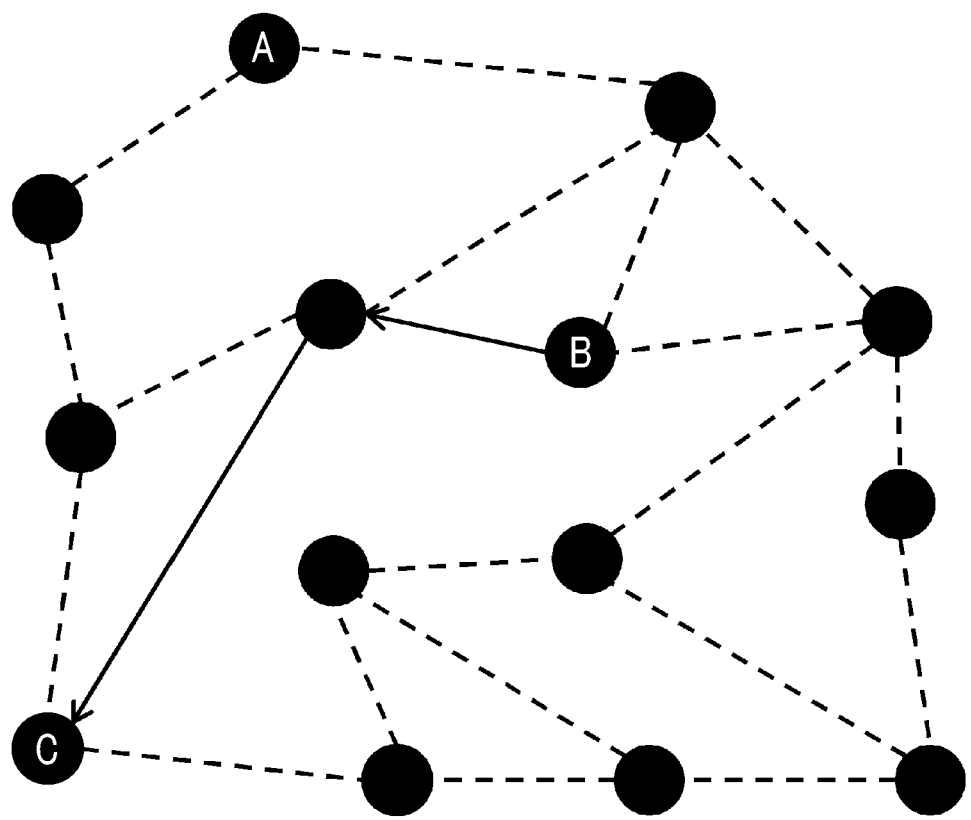
FIG. 5 is a diagram illustrating a road network according to Example 1.

Specifically, the service command generation unit 2022 decides, with reference to the stored positional information of the autonomous traveling vehicles 100, the autonomous traveling vehicle 100 that loads the purchase considering commodity and is positioned closest to the desired delivery destination or the autonomous traveling vehicle 100 that is arrivable at a desired delivery destination of the user at the earliest. Here, it is assumed that a vehicle positioned in a node B shown in FIG. 5 is selected. Accordingly, a service command is transmitted from the server apparatus 200 to the target autonomous traveling vehicle 100 (Step S106), and the user is notified of authentication information (Step S107).

The service command includes, for example, a content relating to movement of the autonomous traveling vehicle 100 that the autonomous traveling vehicle 100 moves to the desired delivery destination (in this case, a point of a node C) of the user and is on standby, and the same authentication information as that notified to the user. The authentication information may be, for example, a password based on a combination of numerals and symbols, a QR code (Registered Trademark), or the like.

The service command may information relating to processing to be performed on a route or a service to be provided.

In Step S108, the autonomous traveling vehicle 100 (service schedule generation unit 1031) generates a service schedule based on the received service command. In the example, for example, a service schedule that the autonomous traveling vehicle 100 travels along a route indicated by a solid line of FIG. 5 and is on standby for the user in the node C is generated. The generated service schedule is transmitted to the traveling controller 1033, and the service is started (Step S109). During the service, transmission of the positional information and the inventory information to the server apparatus 200 is performed at regular intervals.

When the autonomous traveling vehicle 100 arrives at the desired delivery destination of the user, the autonomous traveling vehicle 100 is brought into a standby state (Step S110), and notifies the server apparatus 200 that the standby state is brought (Step S11). When the notification is received, the server apparatus 200 notifies the user that the autonomous traveling vehicle 100 is on standby at the desired delivery destination (Step S112).

The user unlocks the locking and unlocking device 107 of the autonomous traveling vehicle 100 using the authentication information notified in Step S107 (Steps S113 and S114). With this, the user can confirm (for example, try on accessories, try sports goods, taste foods, or taste beverages) an actual object of the purchase considering commodity loaded in the vehicle. When the locking and unlocking device 107 is brought into an unlocking state, the autonomous traveling vehicle 100 notifies the server apparatus 200 that the unlocking state is brought (Step S115).

Thereafter, when the user leaves the autonomous traveling vehicle 100, and the locking and unlocking device 107 automatically performs locking with an auto-lock mechanism (Step S116), and notifies the server apparatus 200 that the locking state is brought (Step S117). When the notification that the locking state is brought is received, the server apparatus 200 determines that the user attains the purpose, and performs close processing to processing for the above-described matter (Step S118).

The user may apply for purchase of a commodity again after returning home, or may perform settlement with a portable terminal capable of communication before leaving the autonomous traveling vehicle 100 and may take out the commodity loaded in the autonomous traveling vehicle 100. When a sales staff accompanies the autonomous traveling vehicle 100, the user may purchase the commodity through the sales staff. Of course, purchase of the commodity may be canceled.

Reception Processing

Figure 6:
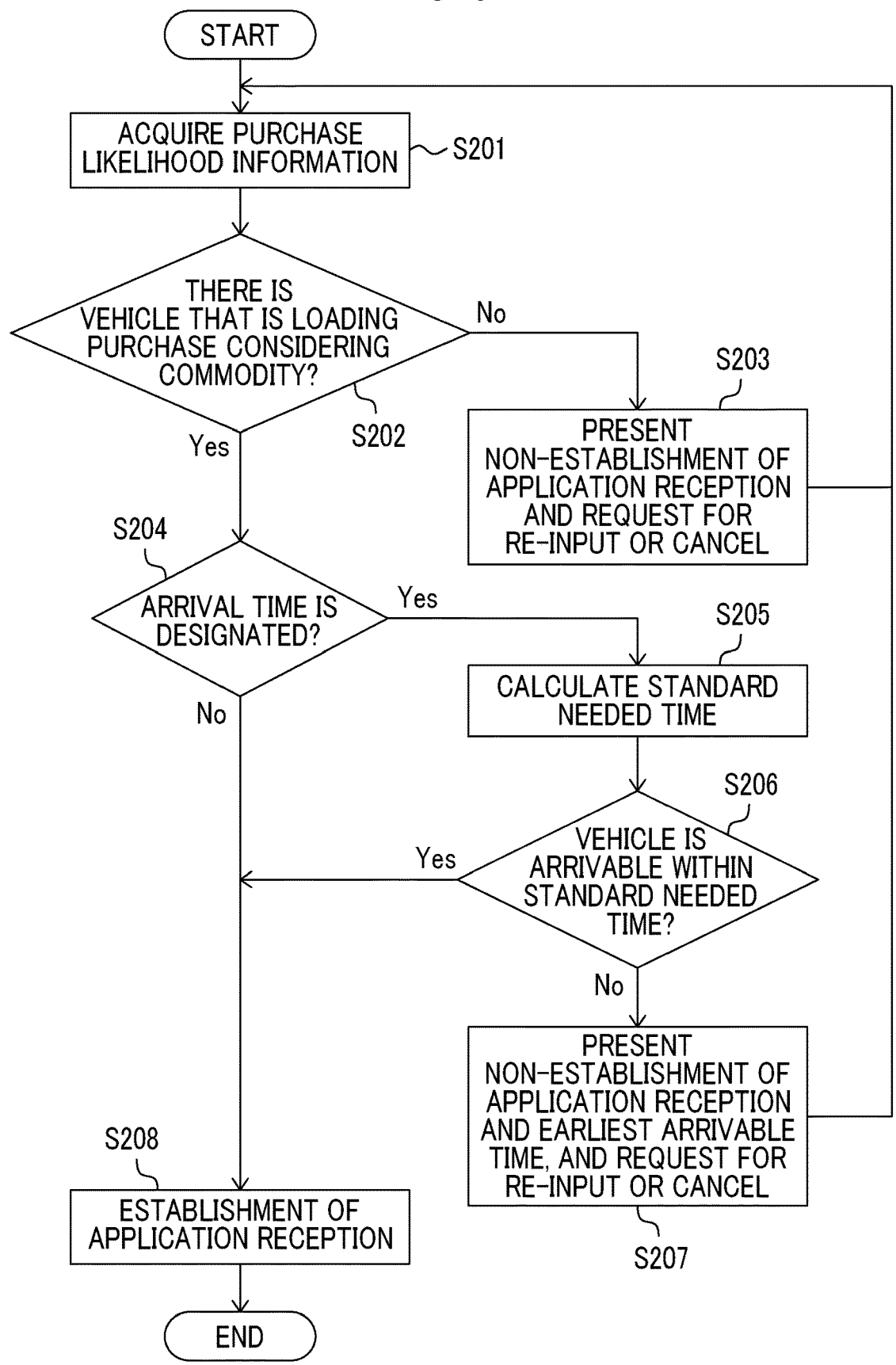
FIG. 6 is a flowchart showing an example of processing for receiving a request of a user.

An example of processing for receiving the request of the user in Step S103 will be described. FIG. 6 is a flowchart showing an example of a flow of the reception processing of the request of the user. The purchase likelihood information acquisition unit 2024 first acquires the purchase likelihood information from the user (Step S201). Subsequently, the stored inventory information is referred to, and determination is made whether or not there is a vehicle that is loading the purchase considering commodity corresponding to the request (Step S202). Here, when there is no autonomous traveling vehicle 100 that is loading the purchase considering commodity corresponding to the request, the user is presented with non-establishment of application reception, and the user is requested for re-input or cancel (Step S203).

In Step S202, when determination is made that there is the autonomous traveling vehicle 100 that is loading the purchase considering commodity, subsequently, determination is made whether or not an arrival time at the desired delivery destination is designated from the user (Step S204). Here, when the time is not designated, the user is presented with establishment of application reception, and the reception processing is completed (Step S208).

In Step S204, when determination is made that time is designated, the autonomous traveling vehicle 100 that can arrive at the desired delivery destination at the earliest calculates a standard needed time from a current position to the desired delivery destination (Step S205), and determines whether or not the autonomous traveling vehicle 100 can arrive at the desired delivery destination within the standard needed time (Step S206).

In Step S206, when determination is made that the autonomous traveling vehicle 100 cannot arrive at the desired delivery destination until the designated time, non-establishment of application reception and the earliest time when the autonomous traveling vehicle 100 can arrive at the desired delivery destination are presented, and re-input or cancel is requested (Step S207). In Step S206, when the autonomous traveling vehicle 100 can arrive at the desired delivery destination until the designated time, the user is presented with establishment of application reception, and the reception processing is completed (Step S208).

With the configuration of Example 1, it is possible to provide a mail-order system capable of allowing the user to confirm an actual object of a commodity considered to be purchased by the user at any place. Since solely a commodity that is actually in stock is subjected and a vehicle that can move toward the desired delivery destination of the user at the earliest is selected with priority, it is possible to allow the user to confirm an actual object in a comparatively short time.

Example 2

Figure 7:
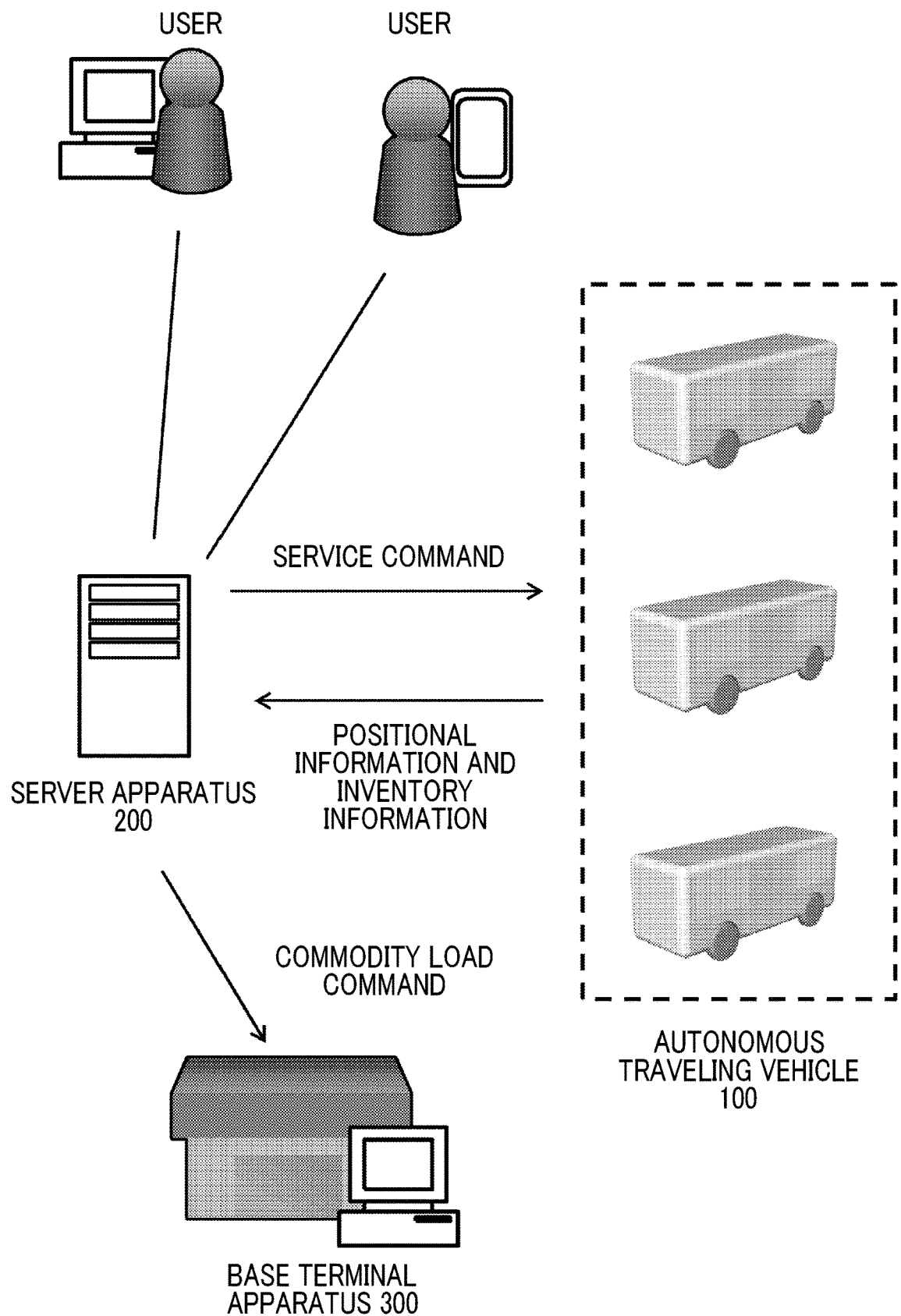
FIG. 7 is a system outline diagram of a mail-order system according to Example 2.
Figure 8:
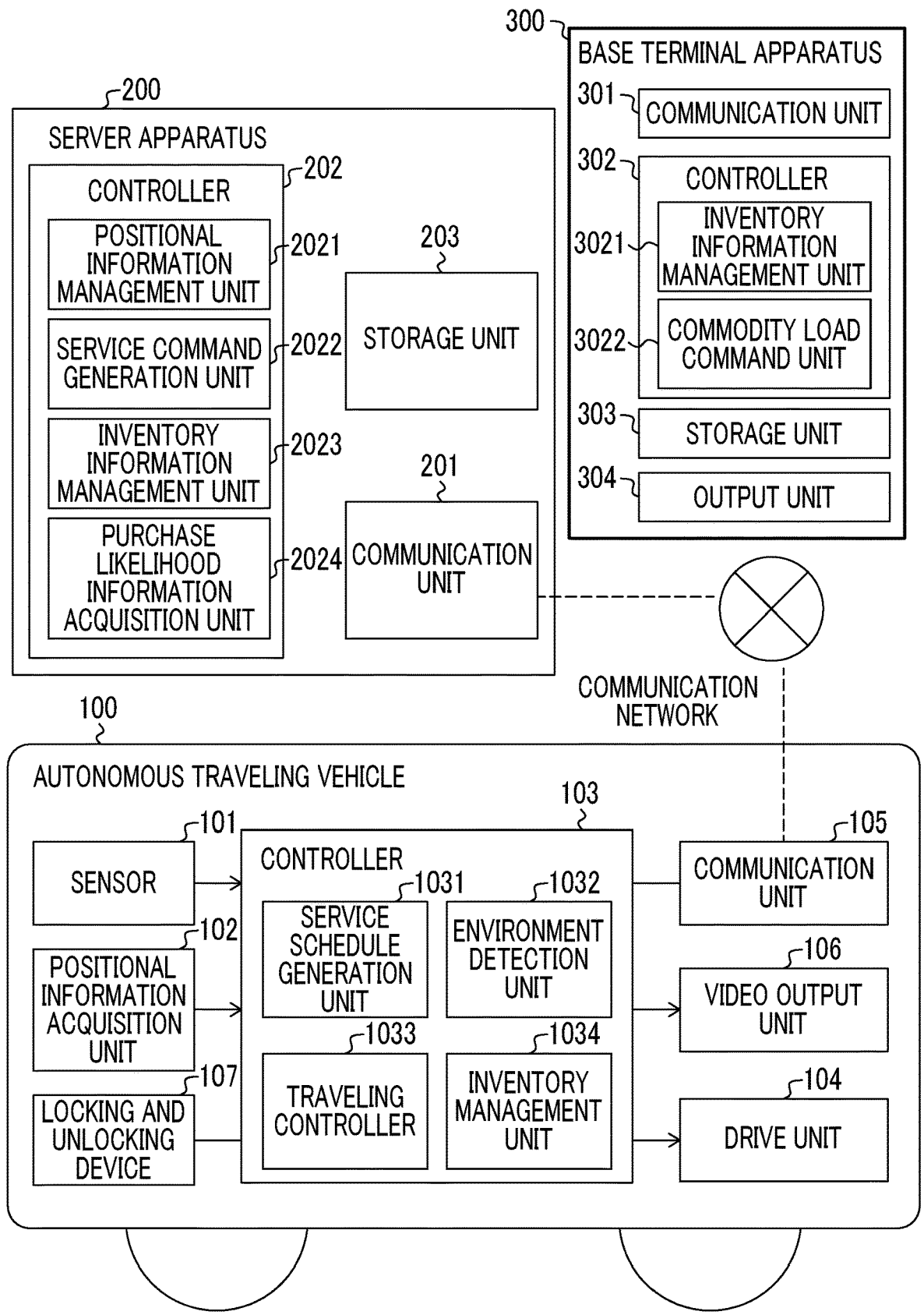
FIG. 8 is a block diagram schematically showing an example of constituent elements in the mail-order system of Example 2.
Figure 9:
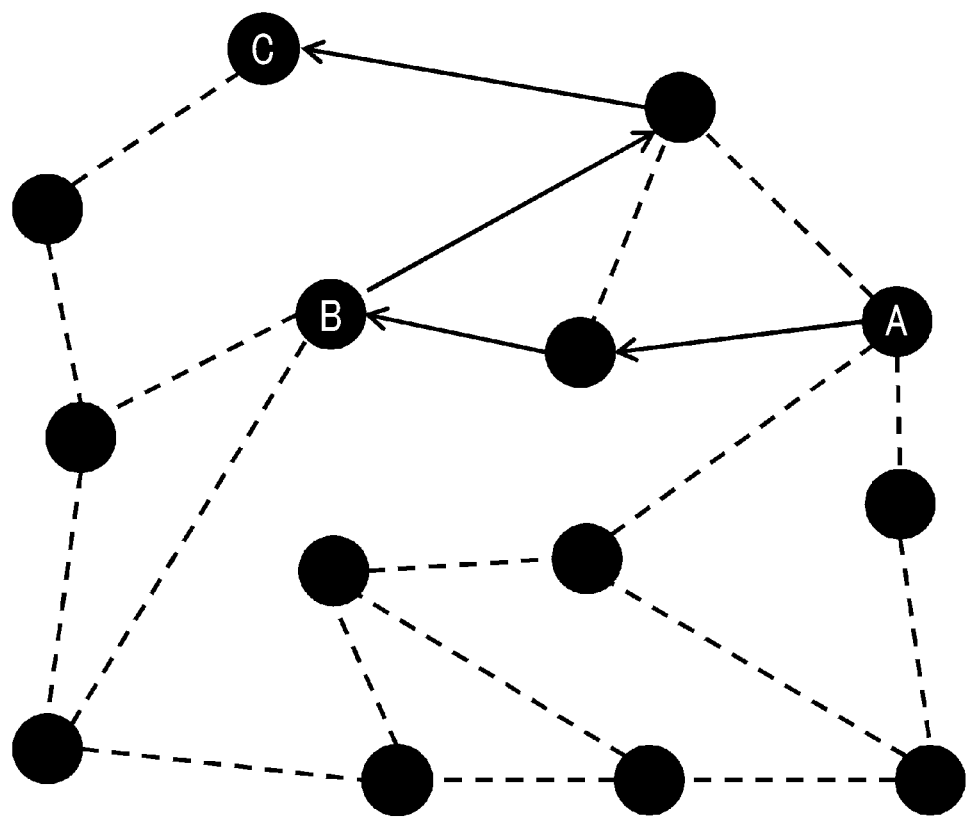
FIG. 9 is a diagram illustrating a road network and movement of an autonomous traveling vehicle according to Example 2.

Example 2 will be described referring to FIGS. 7 to 9. FIG. 7 is a system outline diagram of a mail-order system according to the example, and FIG. 8 is a block diagram schematically showing an example of constituent element in the mail-order system of Example 2. As shown in FIGS. 7 and 8, the mail-order system according to the example is different from Example 1 in that a base terminal apparatus 300 is further provided in the autonomous traveling vehicle 100, in addition to the configuration of Example 1.

The base terminal apparatus 300 is a terminal that is used in a facility (hereinafter, referred to as a commodity loading base) for loading commodities in the autonomous traveling vehicle 100. A plurality of base terminal apparatus 300 may be included in a sales management system. Here, the commodity loading base may include a large-scale distribution center and a base, such as a collection and delivery office in an urban area, regardless of scale, and may double as a vehicle base of the autonomous traveling vehicle 100.

The base terminal apparatus 300 includes a communication unit 301, a controller 302, a storage unit 303, and an output unit 304. Similarly to the communication units 105, 201, the communication unit 301 is a communication interface that is used to perform communication by way of the network. Similarly to the storage unit 203, the storage unit 303 is means for storing information, and is constituted of a RAM or a storage medium, such as a magnetic disk or a flash memory.

The controller 302 is means for controlling the base terminal apparatus 300. The controller 302 is constituted of, for example, a CPU. The controller 302 has, as functional modules, an inventory information management unit 3021 and a commodity load command unit 3022. The functional modules may be realized by the CPU (not shown) executing a program stored in storage means (not shown), such as a ROM.

The inventory information management unit 3021 registers information (warehousing and shipping information) regarding commodities to be warehoused in the base and commodities loaded in the autonomous traveling vehicle 100, stores information in the storage unit 303, and transmits information to the server apparatus 200 through the communication unit. The commodity load command unit 3022 receives a commodity load command to the autonomous traveling vehicle 100 from the server apparatus 200 (inventory information management unit 2023), and outputs the commodity load command to the output unit 304 described below. The commodity load command will be described below.

The output unit 304 is means for outputting various kinds of information, and is constituted of a display device, a printer device, a sound output device, or the like.

The server apparatus 200 (inventory information management unit 2023) according to the example acquires inventory information transmitted from the base terminal apparatus 300 and records the inventory information in the storage unit 203. Then, when the purchase likelihood information acquisition unit 2024 acquires the purchase likelihood information from the user, and when there is no autonomous traveling vehicle 100 loading the purchase considering commodity in the neighborhood of the desired delivery destination, the service command generation unit 2022 performs the following processing.

That is, a service command for stopping over in a commodity loading base, loading a purchase considering commodity, and moving toward a desired delivery destination is transmitted to the autonomous traveling vehicle 100 that is closest to the desired delivery destination and is positioned in the neighborhood of the commodity loading base having a purchase considering commodity in stock. Movement of the autonomous traveling vehicle 100 included in the service command at this time is shown in FIG. 9. FIG. 9 is a diagram illustrating a road network and movement of the autonomous traveling vehicle 100 according to Example 2. In FIG. 9, the desired delivery destination of the user is represented by a node C, a commodity loading base that is closest to the desired delivery destination and has an inventory of the purchase considering commodity is represented in a node B, and an initial position of the autonomous traveling vehicle 100 elected by the server apparatus 200 is represented in a node A.

In the above description, "the autonomous traveling vehicle 100 that is positioned in the neighborhood of the commodity loading base having the purchase considering commodity in stock" also includes the autonomous traveling vehicle 100 that is on standby in the commodity loading base.

The server apparatus 200 (inventory information management unit 2023) transmits a command (commodity load command) for loading the purchase considering commodity in the autonomous traveling vehicle 100 to be designated to the base terminal apparatus 300.

As described above, the commodity load command transmitted from the server apparatus 200 (inventory information management unit 2023) is output from the output unit 304. When a person loads a commodity in the commodity loading base, the person may confirm the command output from the display device, the printer device, or the like, and then, may load the designated commodity in the designated autonomous traveling vehicle 100. When loading of a commodity is automated with a transportation robot or the like, an instruction for loading the designated commodity in the designated autonomous traveling vehicle 100 may be transmitted (output) to the transportation robot.

With the mail-order system of the example, when the request is received from the user, even when the autonomous traveling vehicle 100 that loads the purchase considering commodity is not present in the neighborhood of the desired delivery destination of the user, it is possible to make the autonomous traveling vehicle 100 loading the purchase considering commodity move toward the desired delivery destination reliably.

Example 3

In the mail-order system of Example 2, although the commodity load command that is transmitted from the server apparatus 200 (inventory information management unit 2023) and is received by the base terminal apparatus 300 has the content that the purchase considering commodity of the user is loaded in the autonomous traveling vehicle 100, the commodity load command may have a content that a recommended commodity is loaded along with the purchase considering commodity.

Here, the recommended commodity includes a commodity that has characteristics (for example, color, size, material, shape, function, quality, and the like) similar to the purchase considering commodity, a commodity that is often purchased along with the purchase considering commodity, a top selling commodity in a commodity field of the purchase considering commodity, and the like.

The mail-order system according to the example has a configuration in which the controller 202 of the server apparatus 200 includes, as a functional module, a recommended commodity information acquisition unit that acquires information regarding a recommended commodity according to the purchase considering commodity, in addition to the configuration of Example 2. The recommended commodity information acquisition unit acquires recommended commodity information to the purchase considering commodity, for example, from commodity data including specification information of commodities, purchase history data including purchase history data of the user, and the like.

Then, the inventory information management unit 2023 transmits a commodity load command for loading a recommended commodity stocked in the commodity loading base in the autonomous traveling vehicle 100 along with the purchase considering commodity based on the recommended commodity information to the base terminal apparatus 300.

With such a configuration, the mail-order system according to the example can have a recommendation function, and when an actual object of the purchase considering commodity is presented to the user, can present an actual object of a recommended commodity along with the actual object of the purchase considering commodity. For this reason, it is possible to allow the user to consider purchase of a commodity by comparing actual objects, and to increase convenience.

Others

The respective examples described above merely illustrate the disclosure, and the disclosure is not limited to the specific aspects described above. Various modifications may be made to the disclosure within the scope of the technical idea of the disclosure. For example, even when the autonomous traveling vehicle 100 that loads the purchase considering commodity is present in the vicinity of the desired delivery destination of the user, a service command for making the autonomous traveling vehicle 100 stop over in the closest commodity loading base once without moving toward the desired delivery destination of the user instantly, load the recommended commodity, and then, move toward the desired delivery destination of the user may be created.

A configuration may be made in which the autonomous traveling vehicle 100 includes a terminal for performing settlement. With such a configuration, even though the user does not carry a portable terminal that can perform communication, or the like, it is possible to allow the user to purchase a commodity instantly on the spot and to take out the commodity.

In the respective embodiments described above, although the server has been described as the server apparatus 200, a configuration may be made in which a mail-order server taking charge of a function of mail-order or a vehicle service management server taking charge of a function of vehicle service management is provided.

What is claimed is:

1. A mail-order system comprising:
a server apparatus; and
a moving object, wherein:
the server apparatus includes
a purchase likelihood information acquisition unit configured to acquire at least information regarding a commodity considered to be purchased by a user and information regarding a desired delivery destination of the commodity;
determine whether or not there is a vehicle that is loading the commodity to be purchased;
upon determination that there is no vehicle that is loading the commodity to be purchased, present the user with non-establishment of application reception, and request the user to re-input or cancel;
upon determination that there is a vehicle that is loading the commodity to be purchased, determine whether an arrival time at the desired delivery destination is designated from the user;
upon determination that the arrival time at the desired delivery destination is not designated, present the user with establishment of application reception;
upon determination that the arrival time at the desired delivery destination is designated, determine whether the vehicle can arrive at the desired delivery destination by the arrival time;
upon determination that the vehicle cannot arrive at the desired delivery destination by the arrival time, present the user with non-establishment of application reception, present the user with an earliest time that the vehicle can arrive at the desired delivery destination, and request the user to re-input or cancel, and
a moving object management unit configured to give an instruction relating to at least movement to the moving object;

the moving object is able to load commodities;
the moving object includes a movement controller configured to make the moving object move in an autonomous moving mode;
at least one of the server apparatus and the moving object includes
a positional information acquisition unit configured to acquire positional information of the moving object, and
an inventory management unit configured to manage an inventory of commodities loaded in the moving object; and
the moving object management unit is configured to give a service command to the moving object loading the commodity considered to be purchased by the user to move to the desired delivery destination; wherein
when the moving object arrives at the desired delivery destination of the user, the moving object notifies the server apparatus that the moving object is in a standby state;
when the server apparatus receives notification that the moving object is in the standby state, the server apparatus notifies the user that the moving object is on standby at the desired delivery destination;
when the user unlocks the locking and unlocking device of the moving object, the moving object notifies the server apparatus that the moving object is in an unlocking state; and
when the user leaves the moving object, the moving object automatically performs locking of the locking and unlocking device and notifies the server apparatus that the moving object is in a locking state.

2. The mail-order system according to claim 1, wherein:
at least one of the server apparatus and the moving object further includes a route setting unit configured to set a moving route for allowing the moving object to move to the desired delivery destination based on the information regarding the desired delivery destination acquired by the purchase likelihood information acquisition unit and the positional information acquired by the positional information acquisition unit; and
the movement controller is configured to receive the service command and perform control such that the moving object moves along the route set by the route setting unit.

3. The mail-order system according to claim 1, further comprising a base terminal apparatus that is used at a commodity loading base where commodities are loaded in the moving object, wherein:
the inventory management unit is configured to transmit a commodity load command as an instruction to load the commodity considered to be purchased by the user in the moving object to the base terminal apparatus; and
the moving object management unit is configured to give the moving object an instruction to move to the commodity loading base where the base terminal apparatus receiving the commodity load command is present, and give an instruction to the moving object to move to the desired delivery destination.

4. The mail-order system according to claim 3, wherein:
the server apparatus further includes a recommended commodity information acquisition unit configured to acquire information regarding a recommended commodity according to the commodity considered to be purchased by the user; and the inventory management unit is configured to transmit an instruction to collectively load the recommended commodity in the moving object.

5. The mail-order system according to claim 1, wherein:
the number of moving objects is plural; and
the moving object management unit is configured to, when the number of moving objects loading the commodity considered to be purchased by the user is plural, give an instruction to a moving object closest to the desired delivery destination among the moving objects to move to the desired delivery destination.

6. The mail-order system according to claim 1, wherein:
the moving object further includes a locking and unlocking unit configured to lock and unlock a space where the commodity is loaded; and
the server apparatus further includes an authentication information issuance unit configured to issue authentication information for bringing the locking and unlocking unit into an unlocking state, and transmit the authentication information to a terminal used by the user and the locking and unlocking unit.

7. The mail-order system according to claim 1, wherein the moving object further includes a settlement unit configured to perform settlement of commodity trade.

8. A mail-order method that is performed using a moving object loadable commodities and movable in an autonomous moving mode, the mail-order method comprising:
acquiring positional information of the moving object;
acquiring inventory information of commodities loaded in the moving object;
acquiring purchase likelihood information including information regarding a commodity considered to be purchased by a user and information regarding a desired delivery destination of the commodity;
determining whether or not there is a vehicle that is loading the commodity to be purchased;
upon determination that there is no vehicle that is loading the commodity to be purchased, presenting the user with non-establishment of application reception, and requesting the user to re-input or cancel;
upon determination that there is a vehicle that is loading the commodity to be purchased, determining whether an arrival time at the desired delivery destination is designated from the user;
upon determination that the arrival time at the desired delivery destination is not designated, presenting the user with establishment of application reception;
upon determination that the arrival time at the desired delivery destination is designated, determining whether the vehicle can arrive at the desired delivery destination by the arrival time;
upon determination that the vehicle cannot arrive at the desired delivery destination by the arrival time, presenting the user with non-establishment of application reception, presenting the user with an earliest time that the vehicle can arrive at the desired delivery destination, and requesting the user to re-input or cancel;
giving a command to the moving object loading the commodity to move to the desired delivery destination based on the information regarding the commodity considered to be purchased by the user acquired in the acquiring of the purchase likelihood information;
when the moving object arrives at the desired delivery destination, receiving a notification that the moving object is in a standby state;
upon receiving the notification that the moving object is in the standby state, notifying the user that the moving object is on standby at the desired delivery destination;
when the user unlocks a locking and unlocking device of the moving object, receiving a notification that the moving object is in an unlocking state; and
when the user leaves the moving object, causing the moving object to automatically perform locking of the locking and unlocking device and receiving a notification that the moving object is in a locking state.

* * * * *